United States Patent [19]
Klabunde

[11] 3,975,439
[45] Aug. 17, 1976

[54] PREPARATION AND AMINATION OF IODOANILINE

[75] Inventor: Ulrich Klabunde, West Chester, Pa.

[73] Assignee: E. I. Du Pont de Nemours and Company, Wilmington, Del.

[22] Filed: July 26, 1973

[21] Appl. No.: 382,844

[52] U.S. Cl. ............................... 260/581; 204/62; 204/81
[51] Int. Cl.² ........................................ C07C 85/02
[58] Field of Search ................. 260/581; 204/62, 81

[56] References Cited
UNITED STATES PATENTS

| | | | |
|---|---|---|---|
| 2,001,284 | 5/1935 | Prahl et al. ...................... | 260/581 X |
| 2,036,134 | 3/1936 | Graenacher et al. ........... | 260/581 X |
| 3,277,175 | 10/1966 | Clemens ........................ | 260/581 X |

FOREIGN PATENTS OR APPLICATIONS

| | | | |
|---|---|---|---|
| 2,154,348 | 5/1973 | Germany ....................... | 260/581 X |

OTHER PUBLICATIONS
Miller et al., "J.A.C.S.", 92, p. 2821, 1970.
Rodd, "Chemistry of Carbon Compounds", Elsevier Publishing Co., 1954, vol. III, Part A, p. 159.

*Primary Examiner*—Paul F. Shaver

[57] ABSTRACT

Described is a cyclic process for preparing p-phenylenediamine from aniline and ammonia including aminating iodoaniline, recovering the iodide from the amination, and electrolyzing the iodide with aniline back to iodoaniline. Also described are the two basic reactions of the cyclic process, a new process for preparing phenylenediamines by the amination of the corresponding iodoanilines with ammonia in the presence of copper metal or a copper(I) salt and a new process for preparing p-iodoaniline by electrolysis of aniline with ammonium iodide as well as a new compound useful in the amination.

21 Claims, 1 Drawing Figure

U.S. Patent   Aug. 17, 1976   3,975,439
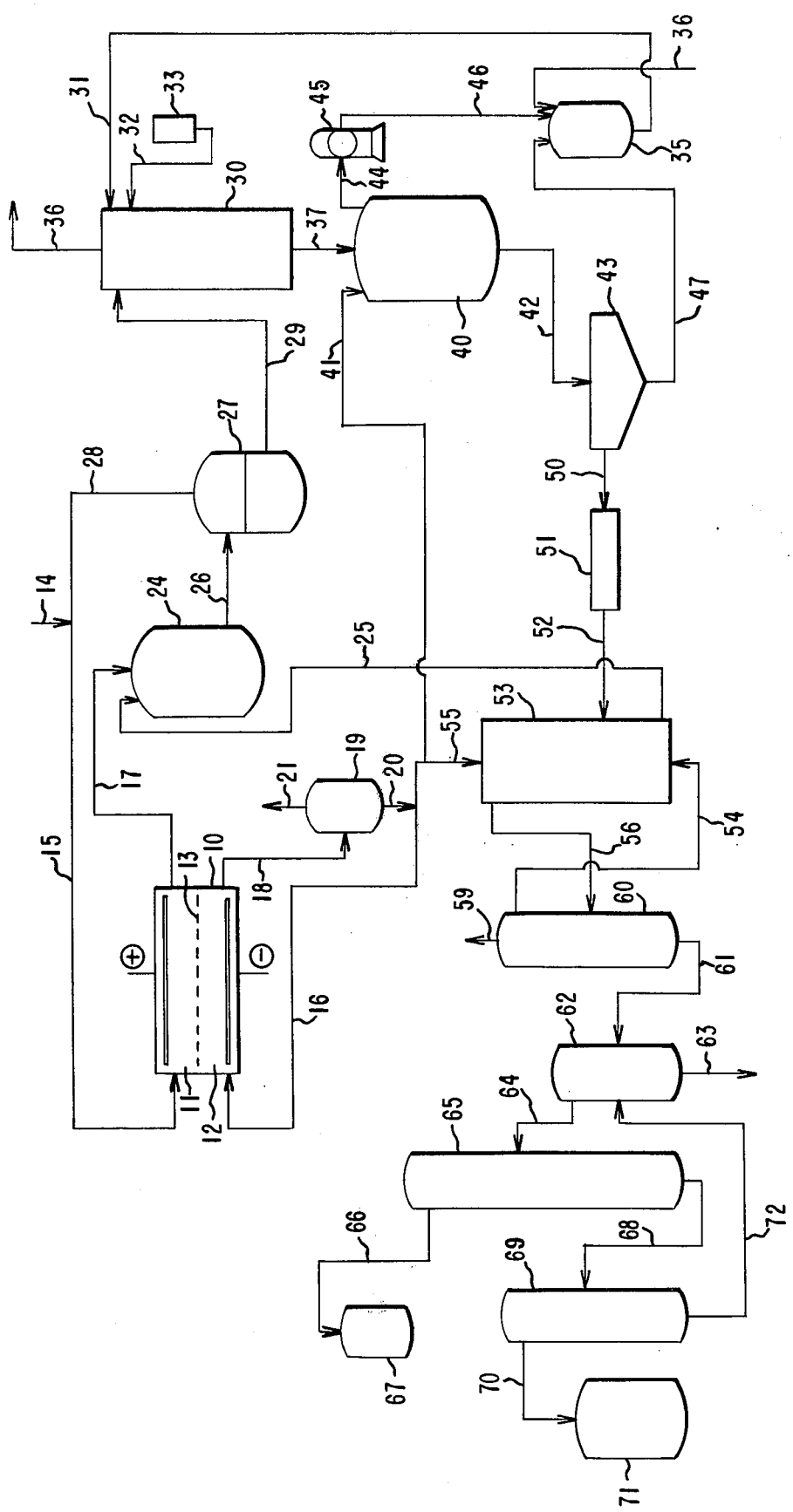

PREPARATION AND AMINATION OF IODOANILINE

BACKGROUND OF THE INVENTION

1. Field of the Invention

This invention relates to, and has as its principal object provision of, a novel high-yield process for the preparation of o-, m-, and p-phenylenediamine by the amination of the corresponding iodoaniline with ammonia at low to moderate temperatures in the presence of a copper catalyst. It also provides a process for the electrolytic preparation of p-iodoaniline, the key intermediate used here in the amination to prepare p-phenylenediamine, and a cyclic process combining the amination and recovery of iodine values with the electrolysis.

2. Relation to the Prior Art

Replacement of aromatic halogen atoms by amino groups is not a new reaction. p-Phenylenediamine has been prepared from p-dichlorobenzene (D. R. P. 202170 (1907)) and from p-chloroaniline (D. R. P. 204848 (1908)) by reaction with aqueous ammonia at 180°–200°C in the presence of a copper(II) sulfate catalyst. Cuprous iodide has also been used as a catalyst to convert p-dichlorobenzene to p-phenylenediamine (Quick, J. Am. Chem. Soc., 42, 1033 (1920)) at 200°C with aqueous ammonia. The use of anhydrous ammonia in alcohol gave no product.

Chloro-, bromo- and iodobenzene are all converted essentially completely to aniline at 180°–200°C with aqueous ammonia and "copper sulfate or other copper salt" catalyst (Rodd, "Chemistry of Carbon Compounds", Elsevier Publishing Co., 1954, Vol. III, Part A, p. 159). Higher conversions of the activated chlorine atom in p-nitrochlorobenzene to an amino group were obtained with 60% aqueous ammonia than with anhydrous ammonia (IGF-Hoechst BIOS Final Report No. 1477, Item No. 22).

Miller, Kujawa and Campbell, J. Am. Chem. Soc. 92, 2821 (1970) describe the electrolytic iodination of aromatic hydrocarbons using iodine in acetonitrile medium. This appears to be the closest art to the electrochemical aspect of the present invention, an iodination process using iodide ion and aniline in an aqueous medium.

It has not been known heretofore to convert iodoanilines to phenylenediamines by reaction with ammonia or to electrolyze aniline to p-iodoaniline with ammonium iodide.

SUMMARY OF THE INVENTION

The present invention is basically a process for the preparation of o-, m-, and p-phenylenediamine by catalyzed amination of the corresponding o-, m- and p-iodoanilines with substantially anhydrous ammonia in the presence of a copper metal or copper(I) salt catalyst under mild reaction conditions.

The reaction is carried out in liquid ammonia as reactant and solvent or alternatively with anhyrous ammonia in the presence of a nonreactive solvent. The reaction temperature range is 0°–160°C under autogenous pressure of the ammonia reaction medium. Higher temperature, up to 220°C, may be employed in liquid systems employing a solvent.

This invention also includes an improved process for the preparation of p-iodoaniline, namely electrolysis of a mixture of ammonium iodide and aniline to give high yields of p-iodoaniline directly from iodide ion. Alternatively, the ammonium iodide recovered from the amination reaction may first be converted to an alkali metal iodide before electrolysis. This improved process circumvents the necessity of starting with iodine in the preparation of p-iodoaniline and can be combined with the catalytic amination, above, in a cyclic process forming p-phenylenediamine as shown in the FIGURE.

THE FIGURE

The FIGURE, described in detail below, represents a preferred overall cyclic process of the invention.

DETAILS OF THE INVENTION

The basic process of the present invention is a catalyzed amination of an iodoaniline to give the corresponding phenylenediamine. The reaction is applicable to the individual iodoaniline isomers, i.e., o-iodoaniline, m-iodoaniline and p-iodoaniline, to give the corresponding o-phenylenediamine, m-phenylenediamine and p-phenylenediamine isomers. It is also possible to use mixtures of the iodoaniline isomers to give the corresponding mixtures of phenylenediamines. Amination is preferably carried out with p-iodoaniline or p-iodoaniline containing small amounts of the o- and m-isomers.

The amination reaction is preferably carried out in substantially anhydrous liquid ammonia as reactant and solvent. The use of anhydrous ammonia has the advantage of giving aminated products in high yield and very high purity. For example, nearly colorless p-phenylenediamine prepared by the process of this invention is obtained in >96% purity from the reaction mixture.

The amination reaction proceeds very rapidly at low temperatures in liquid ammonia; over 80% conversion of p-iodoaniline to p-phenylenediamine occurs at 60°C in 30 minutes or less.

It is also possible to conduct the amination using anhydrous ammonia in a nonaqueous solvent. Suitable solvents include saturated aliphatic alcohols, preferably containing no more than 10 carbon atoms, aliphatic and aromatic hydrocarbons, ethers, aliphatic and aromatic nitriles and aromatic amines. Examples of such solvents include methanol, ethanol, n-butanol, t-butanol, n-octanol, n-decanol, ethylene glycol, hexane, decane, isooctane, benzene, toluene, the xylenes, tetrahydrofuran, dioxane, diethyl ether, dibutyl ether, bis(2-methoxyethyl)ether, 1,2-dimethoxyethane, acetonitrile, benzonitrile, aniline, phenylenediamine and p-phenylenediamine. Aniline is a preferred solvent for the amination reaction.

The molar ratio of ammonia to iodoaniline must be at least 1:1 to effect complete replacement of the iodine by amine groups. Excessive amounts of ammonia are not harmful and are always present when the reaction is carried out in anhydrous liquid ammonia. Excess ammonia is beneficial in reducing the amount of by-product 4,4'-diaminodiphenylamine formed. A practical upper limit to insure adequate space-time yields in the chosen reactor is about 100:1. It is preferred to use a ratio between 6:1 and 40:1 to insure an adequate reaction rate.

The amination reaction is catalyzed by copper(I) salts. The specific anion associated with the cuprous cation may be selected from the group halide, nitrate, sulfate, thiocyanate, oxide, acetate, propionate, butyrate and carbonate. Examples of useful catalysts include copper(I) iodide, copper(I) bromide, copper(I) chloride, the 1:1 copper(I) iodide.p-phenylenediamine complex, copper(I) oxide, copper(I) hydroxide, copper(I) nitrate, copper(I) sulfate and copper(I) thiocyanate. Preferred are the copper(I) halides, especially the newly synthesized 1:1 copper(I) iodide.p-phenylenediamine complex. It is also possible to use a mixture of a suitable copper(II) salt and a reducing agent to obtain the in situ formation of the desired copper(I) salt. For example, a mixture of copper(II) sulfate and copper metal may be effectively employed. Other copper(II) salts which may be used include copper(II) nitrate, copper(II) chloride, copper(II) bromide, copper(II) fluoride, copper(II) oxide, $K_2CuF_4$, copper(II) sulfate, copper(II) acetate, and $Cu(NH_3)_4Cl_2$. Other suitable reducing agents include zinc metal, iron metal, hydrazine and hydrogen gas with or without a hydrogenation catalyst, e.g., palladium or platinum on carbon. Since small amounts of copper(II) ion are formed during the amination reaction by oxidation of copper(I) ion by iodoaniline, it is advantageous to employ a reducing agent to minimize this oxidation. Preferred reducing agents include hydrazine, copper metal, and hydrogen gas.

The amount of catalyst used is ordinarily between about 1–1000 millimoles of catalyst/mole of iodoaniline. It is preferred to use 15–150 millimoles of catalyst/mole of iodoaniline reacted. The catalyst may be recycled and reused again. For example, after amination of p-iodoaniline, catalyzed by copper(I) iodide, and extraction of the p-phenylenediamine with an organic solvent, a copper(II)/copper(I) iodide salt mixture remains. Dissolution of this salt in water followed by acidification, or dissolution of the salt in an aqueous ammonium iodide solution, causes precipitation of the copper as copper(I) iodide which is readily separated and recycled to the amination reaction.

When the amination reaction is carried out in a liquid ammonia system, the reaction temperature may be 0°–160°C. In this system, it is preferred to operate between 40°C and 140°C. When a nonreactive solvent is used, higher operating temperatures may be employed, up to about 220°C. Reaction time varies depending upon the temperature employed, but in a batch process it is usually sufficiently long to effect substantially complete reaction of the iodoaniline. If a continuous process is employed, it may be desirable to employ shorter reaction times to obtain a partial conversion of the iodoaniline to phenylenediamine with subsequent separation and recycle of the iodoaniline. For example, p-iodoaniline is readily separated from p-phenylenediamine by extraction with aliphatic hydrocarbons such as hexane, isooctane, etc. It is also possible to separate p-iodoaniline by sublimation.

The pressures employed in the amination are not critical and are normally the autogenous pressures of the system at the reaction temperatures used.

The process of this invention can be readily carried out using well-known chemical engineering practice which includes continuous, semicontinuous, and batch operation.

The present invention also provides an improved process for the preparation of p-iodoaniline (PIA) used as a starting material for the preparation of p-phenylenediamine (PPD). p-Iodoaniline is a known compound and may be prepared directly by iodination of aniline (AN) with elemental iodine in an aqueous sodium bicarbonate solution (Org. Syntheses, Coll. Vol. 2, John Wiley & Sons, Inc., New York, 1943, p. 347). The present improvement consists of the direct iodination of aniline with iodide ion in an electrolytic process. After the amination of p-iodoaniline as described above, the by-product iodine is in the form of iodide ion (ammonium iodide). Electrolysis permits the recovered iodide ion to be used directly in a cyclic process for the preparation of additional p-iodoaniline, thus:

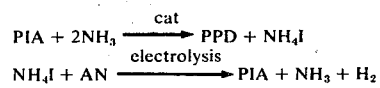

or, alternatively,

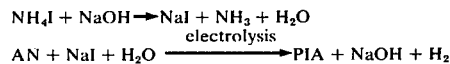

Other alkali metals may, of course, be substituted for sodium here, e.g., potassium and cesium.

The electrolysis can be carried out at temperatures of 0°–80°C in an aqueous medium, although it is preferred to operate at temperatures of 20°–50°C. If desired, a water-immiscible solvent can be added to the medium to aid in maintaining clean electrode surfaces. Suitable solvents include aromatic hydrocarbons, e.g., benzene, aliphatic hydrocarbons, e.g., hexane, isooctane, heptane, and chlorocarbons, e.g., chlorobenzene, chloroform and methylene chloride, or preferably excess aniline.

Electrodes employed in this process can be of any suitable material resistant to iodine. Preferred electrodes include those fabricated from platinum, titanium coated with precious metal, carbon or stainless steel.

Single-cell voltages employed are not critical, but must be high enough to give an anode potential above about 0.5 volt, the threshold voltage required for the $I^-$, $I_2$ reactions, versus the standard hydrogen potential. Single-cell voltages of 0.5–20 volts are preferred. A current density sufficient to achieve a desirable rate of electrolysis is necessary, and current densities in the range of 10–1000 amperes per square foot are suitable, 50–200 amperes per square foot being preferred.

The cathode and anode compartments of the electrolytic cell may be separated by an anion- or cation-exchange membrane fabricated of any suitable material resistant to iodine. If an anion-exchange membrane is used, anions, e.g., iodide and hydroxide ions, may diffuse from the cathode compartment to the anode compartment, but cations would not pass through the membrane. If a cation-exchange membrane is used, cations, e.g., ammonium or sodium ions, may diffuse from the anode compartment to the cathode compartment where ammonium hydroxide or sodium hydroxide is produced. In either case, no gross mixing of catholyte and anolyte occurs. Thus, any p-phenylenediamine present in the catholyte remains there.

In accomplishing the cyclic process of the equations above, various modifications may be employed. Thus, amination of p-iodoaniline is carried out as described, either in a batch of continuous process. After the distillation of excess ammonia, any unreacted p-iodoaniline is separated from the residue by extraction with an aliphatic hydrocarbon, or by sublimation. The p-phenylenediamine product is extracted with an organic solvent such as methylene chloride or dichloroethane, and the residual salts are dissolved in water to precipitate the cuprous iodide catalyst. After separation of the cuprous iodide, the remaining aqueous solution, containing recovered ammonium iodide, is electrolyzed with aniline to produce p-iodoaniline and thus complete the cycle.

Alternatively, product p-phenylenediamine can be extracted with an organic nitrile, e.g., acetonitrile, which also serves to extract the ammonium iodide and leave a copper(II)/copper(I) iodide salt mixture as a residue. This residue can be treated with water to recover copper as copper(I) iodide. The acetonitrile solution is neutralized, e.g., with aqueous sodium or potassium hydroxide solution, and the volatiles ammonia and acetonitrile are separated by distillation. p-Phenylenediamine is separated from the alkali metal iodide by extraction with an aliphatic halide and subsequently recovered. Residual iodide is dissolved in water, any precipitated copper(I) iodide separated, and the aqueous solution electrolyzed with aniline to obtain p-iodoaniline.

In another alternative procedure, the product left from the distillation of excess ammonia is dissolved in water from which copper(I) iodide.p-phenylenediamine complex precipitates. The precipitated complex is separated and may be recycled directly to the amination reaction without separation of the components. The resulting solution is neutralized, e.g., with sodium hydroxide, to separate the major portion of the p-phenylenediamine product. The remaining solution, which contains sodium iodide contaminated with small amounts of p-phenylenediamine, is used as the catholyte in the electrolysis of aniline in a cell with an anion-exchange membrane separating the cell compartments. The crude p-phenylenediamine may be further purified by recrystallization from water followed by distillation.

An embodiment of a preferred overall cyclic process is shown in the FIGURE, a flow-sheet of the process. The basic reactions of the process, i.e., the electrolysis of the iodide ion and reaction of the formed iodine and aniline to give 94 to 96% p- and 4 to 6% o-iodoaniline and the amination of iodoaniline to phenylenediamine, are carried out in electrolytic cell 10 and aminator 30, respectively.

Electrolytic cell 10 is divided into anode (+) compartment 11 and cathode (−) compartment 12 by means of cationic membrane 13. Aniline is introduced into anode compartment 11 through lines 14 and 15 and 6–15% aqueous sodium hydroxide solution, into the cathode compartment 12 through line 16. An aqueous solution from decanter 27, consisting largely of water, sodium iodide and sodium hydroxide, is introduced back into the anode compartment through line 28. Anolyte solution containing iodoaniline in excess aniline and aqueous sodium iodide is removed from anode compartment 11 through line 17 into surge tank 24. Catholyte solution containing sodium hydroxide is withdrawn from the cathode compartment 12 through line 18 into degasser 19 and out through line 20, hydrogen formed during the electrolysis being vented through line 21.

Into surge tank 24 is introduced aqueous sodium hydroxide/sodium iodide solution through line 25 as well as anolyte solution. In the surge tank, the two solutions are mixed to neutralize hydriodic acid and to keep the pH between 5 and 8 and insure the separation of the aqueous iodide solution. The mixed organic and aqueous solutions are withdrawn through line 26 into decanter 27. In decanter 27, the fluids from surge tank 24 separate into lower and upper layers containing, respectively, 40 to 80% p-iodoaniline in aniline and 5–50% aqueous sodium iodide. The aqueous upper layer is conveyed through line 28 back into the aniline stream to anode compartment 11 and the lower, through line 29 to aminator 30.

Amination of the iodoaniline entering through line 29 is carried out in aminator 30 at 70° to 140°C, with excess ammonia introduced through line 31 in the presence of a Cu(I) catalyst, at least part of which is the 1:1 copper(I) iodide-p-phenylenediamine complex since the constituents are present. A small amount of hydrazine, e.g., 0.1–1 mole of hydrazine per mole of Cu(I) present, is added through line 32 from tank 33 to prevent oxidation of the cuprous ion to the cupric. The catalyst complex is transferred to aminator 30 through line 31 in an ammonia solvent from the catalyst dissolution tank 35. The amination solution may also contain sodium iodide, phenylenediamine, and up to about 5% water. Tolerance of water is a valuable feature inasmuch as it permits the organic material recovered from the electrolysis step to be used without drying. Nitrogen, formed as a by-product in the reduction of Cu(II) with hydrazine, is vented from aminator 30 through outlet 36.

Following amination, the reaction mixture is transferred through line 37 to the copper precipitator-flasher 40. Here sodium hydroxide solution is added from degasser 19 through line 41 to neutralize the ammonium iodide and to effect separation of the copper(I) iodide.p-phenylenediamine complex. The resulting suspension is removed through line 42 to thickener 43. Recovered ammonia is distilled from flasher 40 through line 44, compressed by compressor 45, and transferred through line 46 to the catalyst dissolution tank 35 where it is used to dissolve the catalyst complex. Input ammonia is added to tank 35 through inlet 36 for transfer to aminator 30 through line 31.

In thickener 43, the major portion of the catalyst complex settles out and is transferred through line 47 to the catalyst dissolution tank 35 with some phenylenediamine for return to aminator 30 through line 31. The product solution is passed from thickener 43 through line 50 to filter 51, filtered to remove any remaining catalyst complex, and transferred through line 52 to extractor 53. Excess aniline, obtained as distillate from aniline column 60, is added to extractor 53 through line 54 and the solution from filter 51 is extracted countercurrently with aqueous sodium hydroxide solution, obtained from degasser 19 through line 55, to recover iodide as sodium iodide from the organic solution. The aqueous extract is transferred through line 25 to the surge tank 24, and the organic layer passed through line 56 to the aniline distillation column 60.

In column 60, the lower-boiling aniline fraction is recovered through line 59 and may be recirculated through the system as desired. The higher-boiling product stream from aniline column 60 is passed successively through line 61 to detar distillation column 62 to remove tar and the distillate passed out through line 64 to isomer column 65. In column 65, the phenylenediamine isomers are separated. o-Phenylenediamine is recovered in receiver 67 through line 66. The desired para-isomer passes through line 68 to distillation column 69 for further purification. The product is recovered through line 70 in receiver 71 while impurities are removed through line 72 to the detar column 62.

EMBODIMENTS OF THE INVENTION

There follow some examples which illustrate various embodiments of the invention. Examples 1–5 illustrate the preferred embodiment of the amination of p-iodoaniline, 6–11, details of the amination, 12–13, controls with bromo- and chloro-aniline, 14, in situ generation of a catalyst, 15–16, reaction of m-, and o-iodoaniline, 17–22, electrolysis, 24–25, details of an overall cyclic process. Example 23 is a control showing the inoperability of sodium bromide in the electrolysis process.

In these examples, percentages are by weight. Gas-liquid partition chromatographic analyses (glc) were carried out at 230°C on a ⅛ inch × 8 foot column of 10% octylphenoxypoly(ethyleneoxy)ethanol (Triton X-305, Rohm & Haas) on 80–100 mesh diatomite support. High-pressure liquid chromatographic analyses (HPLC) were carried out on a 1 inch × 2 mm I.D. column filled with a liquid chromatography packing consisting of a solid glass core with a porous silica surface (Corasil I). The mobile phase was 95/5 cyclopentane/methanol solution saturated with water.

EXAMPLE 1

AMINATION OF p-IODOANILINE

An 80-ml stainless steel shaker tube was charged with 10.0 g of p-iodoaniline and 1.0 g of copper(I) iodide, the tube was evacuated and 40 g of anhydrous ammonia was added. The tube was heated at 125°C for 4 hours, cooled, and the excess ammonia evaporated to leave 12.0 g of purple solid. This crude solid was extracted with 500 ml of methylene chloride, and the methylene chloride evaporated to leave 1.7 g of pale purple p-phenylenediamine. Further extraction of the crude solid with warm methylene chloride and combination of the extracts gave a total of 3.35 g (68% yield) of solid extract. The infrared spectrum of this extracted product was identical with that of an authentic sample of p-phenylenediamine.

EXAMPLE 2

A 36-ml thin-walled glass ampoule was charged with 4.85 g of p-iodoaniline, 0.50 g of copper(I) iodide and 8.5 g of ammonia. The sealed ampoule was placed in a bomb which contained liquid ammonia at −78°C as the heat-transfer and pressure-equalizing fluid. The bomb was heated with rocking at 100°C for 2 hours. It was cooled to −78°C and the ampoule removed. While cold, the seal was broken and the ammonia was evaporated at room temperature with exclusion of air. In a dry nitrogen atmosphere the solid was transferred to an extraction thimble and was extracted with boiling methylene chloride under nitrogen. After removal of the solvent, 2.28 g (96%) of p-phenylenediamine remained. A glc analysis showed that the product was pure p-phenylenediamine and that p-iodoaniline was absent.

Anal. Calcd. for $C_6H_8N_2$: C, 66.64; H, 7.45; N, 25.91 Found: C, 66.49; H, 7.49; N, 25.87.

The infrared spectrum was identical to that of an authentic sample of p-phenylenediamine.

EXAMPLE 3

A 250-ml thick-walled glass ampoule was charged with 50.0 g of p-iodoaniline, 5.0 g of copper(I) iodide and 60.0 g of ammonia. The sealed ampoule was placed in an 800-ml bomb which contained 200 ml of methanol at −78°C. The bomb was closed and pressurized with 900 psig of nitrogen, heated to 60°C and kept at this temperature for 1 hour with rocking. The bomb was cooled to −78°C, opened, and the ampoule, which contained a blue solution and a white crystalline solid, removed. After the ampoule was attached to a vacuum line, the ammonia was distilled through a trap at −20°C into a cylinder at −195°C. In a dry nitrogen atmosphere, the residual blue solid was extracted with ten 50-ml portions of acetonitrile. Removal of the solvent under reduced pressure gave 57.2 g of off-white solid.

This solid (27 g), dissolved in 300 ml of acetonitrile, was neutralized with a solution of 6.0 g of potassium hydroxide in 10 ml of water. The solvent was removed under reduced pressure and the solid extracted with methylene chloride as described in Example 2 to give 10.1 g (87% yield) of off-white p-phenylenediamine. The infrared spectrum was identical to that of an authentic sample. The percentage of tar which remained after sublimation of this product at 135°C and 0.1μ pressure was 0.65%.

The neutralization step can also be carried out with tetrahydrofuran as a solvent.

EXAMPLE 4

A 250-ml thick-walled glass ampoule was charged with 50.0 of p-iodoaniline, 5.0 g of copper(I) iodide and 60.0 g of ammonia. The sealed ampoule was shaken to dissolve the solids and allowed to stand at 23°C for 30 hours. After the ammonia was removed and the solid extracted with seven 50-ml portions of acetonitrile, as described in Example 3, the off-white extracted solid was neutralized by dissolution in liquid ammonia. The ammonia was evaporated at room temperature and the residual solid extracted with methylene chloride as in Example 3 to give 23.9 g (97% yield) of off-white p-phenylenediamine. The infrared spectrum was identical to that of an authentic sample.

EXAMPLE 5

A 9-ml steel cylinder was charged with 1.0 g of p-iodoaniline, 0.1 g of copper(I) iodide and 2.0 g of anhydrous ammonia. The cylinder was rotated at 25°C for 1 hour, and the ammonia was vented. The product was dissolved in acetonitrile and analyzed by glc. Approximately 50% of the p-iodoaniline was converted to p-phenylenediamine.

EXAMPLE 6

VARYING THE AMOUNT OF CATALYST

Table I summarizes the results obtained in small-scale experiments by varying the amount of copper(I) iodide used as a catalyst. In the general procedure, six 6-ml ampoules were each charged with 0.20–0.25 g of p-iodoaniline, 0–0.20 g of copper(I) iodide and 0.49 g of anhydrous ammonia. The sealed ampoules were shaken at 25°C until all the solids had dissolved and then placed in a 60°C temperature bath. After 30 minutes the ampoules were removed, and the ammonia was evaporated at room temperature in a nitrogen atmosphere. To each ampoule 2 ml of a tetrahydrofuran (80.7%)-acetonitrile (17.8%) mixture containing 1.4% of p-chloroaniline was added and the solutions were analyzed by glc. The results show that some catalyst is required for the reaction to proceed under these conditions, and p-phenylenediamine is obtained over a wide range of catalyst concentrations.

TABLE I

| No. of mmoles Charged p-Iodoaniline | Charged CuI | % Yield p-Phenylenediamine |
|---|---|---|
| 1.02 | 0.0 | 0 |
| 1.11 | 0.027 | 51 |
| 0.91 | 0.076 | 74 |
| 1.00 | 0.128 | 69 |
| 1.15 | 0.401 | 80 |
| 0.93 | 1.062 | 74 |

EXAMPLE 7

VARYING THE AMOUNT OF AMMONIA

Table II summarizes the results obtained in small-scale experiments varying the ratio of anhydrous ammonia to p-iodoaniline employed in the amination reaction.

Six 6-ml ampoules were each charged with 0.22 g (1 mmole) of p-iodoaniline, 0.02 g of copper(I) iodide and various amounts of ammonia as defined below. The reactions were carried out and analyzed as described in Example 6, above. The results show that excess amounts of ammonia are beneficial in the absence of other solvents.

TABLE II

| No. of mmoles charged $NH_3$ | % Yield p-Phenylenediamine |
|---|---|
| 3.5 | 1 |
| 5.9 | 27 |
| 12.0 | 96 |
| 21.0 | 96 |
| 39.0 | 85 |
| 77.0 | 25 |

EXAMPLE 8

Table III summarizes additional results obtained in small-scale experiments varying the ratio of anhydrous ammonia to p-iodoaniline employed in the amination reaction.

Six 5.2-ml ampoules were each charged with 0.22 g (1 mmole) of p-iodoaniline, 0.01 g of copper(I) iodide, 0.01–0.02 g of copper metal powder and various amounts of ammonia as defined below. The sealed ampoules were shaken at 25°C until all the solids had dissolved and then rotated at 60°C for 25 minutes. After the ammonia was evaporated, each product was dissolved in 2 ml of methanol and analyzed by HPLC. N,N'-Dimethylethylenediamine (2.5 mg) and methylenedianiline (0.20 g) were added to the solutions as internal standards. The results show that excess ammonia is beneficial in reducing the quantity of 4,4'-diaminodiphenylamine condensation product obtained as a by-product.

TABLE III

| No. of mmoles Charged $NH_3$ | p-Iodo-aniline | % Yield p-Phenylene-diamine | 4,4'-Diamino-diphenylamine |
|---|---|---|---|
| 10.6 | 3.0 | 70 | 27 |
| 15.8 | 2.0 | 90 | 8 |
| 21.2 | 7.5 | 86 | 6.5 |

TABLE III-continued

| No. of mmoles Charged $NH_3$ | p-Iodo-aniline | % Yield p-Phenylene-diamine | 4,4'-Diamino-diphenylamine |
|---|---|---|---|
| 26.8 | 18.0 | 77 | 5 |
| 31.4 | 24.0 | 75 | 1 |
| 35.6 | 25.0 | 73 | 2 |

EXAMPLE 9

USE OF A SOLVENT

Six 5-ml ampoules were each charged with 0.15 g (0.68 mmole) of p-iodoaniline, 0.45 g (26 mmoles) of ammonia, 0.025 g of copper(I) iodide and 0.2–0.3 ml of an additional solvent. The reactions were carried out and analyzed as described in Example 6 above. In all cases, p-phenylenediamine was formed. The solvents tested included aniline, tetrahydrofuran, n-butanol, t-butanol, methanol and ethanol.

EXAMPLE 10

VARYING THE COPPER(I) CATALYST

Table IV summarizes the results obtained in small-scale experiments varying the copper salt employed as a catalyst.

Seven 5-ml ampoules were each charged with 0.2 g of p-iodoaniline, 0.45 g of ammonia and 0.05 g of a copper salt. The sealed ampoules were kept in a 60°C temperature bath for 1 hour and then processed and analyzed as described in Example 6 above. With a copper(I) salt as catalyst (Runs 1–4), p-phenylenediamine was the only product formed. Use of a copper(II) salt as catalyst (Runs 5 and 6) gave only trace quantities of PPD. $Cu[P(C_6H_5)_3]_3I$ was ineffective as a catalyst under reaction conditions because the triphenylphosphine ligand is strongly complexed with the Cu(I) ion.

TABLE IV

| Run | Copper Salt | Product |
|---|---|---|
| 1 | $Cu_2I_2$ | Only PPD |
| 2 | $Cu_2Br_2$ | Only PPD |
| 3 | $Cu_2Cl_2$ | Only PPD |
| 4 | $Cu_2O$ | Only PPD |
| 5 | $Cu(NH_3)_4I_2$ | Trace PPD |
| 6 | $Cu(NO_3)_2 \cdot 2H_2O$ | Trace PPD |
| 7 | $Cu[P(C_6H_5)_3]_3I$ | Only recovered PIA |

EXAMPLE 11

Three 5-ml ampoules were each charged with 0.22 g (1 mmole) of p-iodoaniline, 0.45 g (26 mmoles) of anhydrous ammonia and one of the catalysts shown in Table V. The sealed ampoules were slowly rotated in a 60°C temperature bath for 90 minutes. The reaction mixtures were processed and analyzed as described in Example 6.

TABLE V

| Catalyst | Product |
|---|---|
| 0.03 g Cu powder | only PPD |
| 0.02 g Cu powder/0.04 g $Cu(NO_3)_2 \cdot 2H_2O$ | 95% PPD, 5% PIA |
| 0.03 g Fe powder/0.03 g $Cu(NH_3)_4I_2$ | small amount PPD |

EXAMPLE 12

COMPARATIVE REACTIONS OF p-BROMO-, CHLORO-, AND IODOANILINE

A 9-ml steel cylinder was charged with 2.5 mmoles each of p-chloro-, p-bromo- and p-iodoaniline, 0.13 g of cuprous iodide catalyst and 3.0 g of anhydrous ammonia. The cylinder was then rotated at 25°C for 75 minutes. After the ammonia was released, glc analysis of the product showed no change in concentration of p-chloro- and p-bromoaniline, whereas some p-iodoaniline had reacted to give p-phenylenediamine.

EXAMPLE 13

A 35-ml ampoule was charged with 20 mmoles each of p-chloro-, p-bromo- and p-iodoaniline, 1.0 g of cuprous iodide catalyst and 9.1 g of anhydrous ammonia. The sealed ampoule was heated at 100°C for 2 hours, cooled, the ammonia vented and the product extracted with warm methylene chloride and analyzed by glc. All of the p-iodoaniline was converted to p-phenylenediamine but most of the p-chloroaniline was recovered unchanged. A portion of the p-bromoaniline was converted to p-phenylenediamine under these reaction conditions.

EXAMPLE 14

GENERATING A Cu(I) CATALYST IN SITU

Table VI summarizes the results obtained in the amination reaction of an in situ-generated copper(I) catalyst. Three 5.2-ml ampoules were each charged with 0.2 g (1 mmole) of p-iodoaniline, 0.022 g (0.11 mmole) of cupric acetate monohydrate, and 0.45 g (26 mmoles) of ammonia; the first two ampoules also contained 0.01 g (0.1 mmole) of hydrazine dihydrochloride. Amination was carried out at 60°C for 0.5 hour, and the products analyzed as described in Example 8, above. The results show the effectiveness of the generated copper(I) salt catalyst.

TABLE VI

| Run | % Recovery, PIA | % Yield PPD |
|---|---|---|
| 1 | 19.5 | 80.5 |
| 2 | 14.0 | 86.0 |
| 3 | 92.3 | 7.7 |

EXAMPLE 15

REACTION OF o-IODOANILINE

A 36-ml thin-walled glass ampoule was charged with 5.0 g of o-iodoaniline, 0.50 g of copper(I) iodide and 8.5 g of anhydrous ammonia. The sealed ampoule was placed in a bomb which contained methanol at −78°C as the heat-transfer and pressure-equalizing fluid. The bomb was pressured with 1000 psig of nitrogen, heated to 100°C and held at that temperature for 2 hours. The bomb was cooled to −78°C, the ampoule was removed and excess ammonia was evaporated under nitrogen. The residual solid was extracted with six 50-ml portions of acetonitrile, the extracts were combined and the acetonitrile was removed under reduced pressure. The residue was extracted with four 50-ml portions of hexane, the extracts were combined and the hexane was removed under reduced pressure to leave 0.5 g of white solid o-iodoaniline. The infrared spectrum of the product, after sublimation, was identical with that of an authentic sample.

The brown solid remaining after the hexane extraction was dissolved in 100 ml of acetonitrile and neutralized with 0.87 g of sodium hydroxide dissolved in 5 ml of water. After the solvent was removed under reduced pressure, the residue was extracted with six 50-ml portions of hot benzene and the solution was treated with decolorizing charcoal. Addition of 200 ml of heptane and removal of ca. 400 ml of solvent under reduced pressure gave 2.1 g of white solid o-phenylenediamine, mp 99°–100°C. The yield was 95% at 90% conversion of o-iodoaniline.

Anal. Found: C, 66.65; H, 7.53; N, 25.04.

The infrared spectrum was identical to that of an authentic sample of o-phenylenediamine.

EXAMPLE 16

REACTION OF m-IODOANILINE

A 3-ml thick-walled glass ampoule was charged with 0.4103 g of m-iodoaniline, 0.0188 g of copper(I) iodide and 0.89 g of anhydrous ammonia. The sealed ampoule was kept at 28°C for 16.5 hours. After the ammonia was released, the product was dissolved in methylene dichloride and analyzed by glc. Only m-phenylenediamine mixed with some aniline was detected.

EXAMPLE 17

ELECTROLYTIC PREPARATION OF p-IODOANILINE

A 400-ml beaker was charged with 200 ml of water, 10.8 g of ammonia iodide and 1.6 g of aniline. After two platinum electrodes (9 $cm^2$ surface area) were inserted, the solution was electrolyzed at 1.5 volt and ca. 1.0 amp for 2 hours at 25°C.

The solution, which contained some solid, was extracted with methylene chloride. The methylene chloride was evaporated at reduced pressure, and the residual solid p-iodoaniline was washed with water and dried at 25°C (6 $\mu$) for 1 hour. The product was further purified by sublimation at 40°C (1.0 $\mu$).

Anal. Calcd. for $C_6H_6NI$: C, 32.91; H, 2.76; N, 6.40. Found: C, 32.17; 32.19; H, 2.74; 2.77; N, 6.14; 6.14.

The infrared spectrum was identical to that of an authentic sample of p-iodoaniline.

EXAMPLE 18

A. A two-compartment glass electrolytic cell consisting of two 350-ml beaker-like containers each containing near the bottom a 1 inch long side-arm with a 30 mm ground-glass flat flange joint was assembled by cementing an anion-exchange membrane (AMF type C 60) between the flat flange joints.

The anode (+) compartment was charged with 50 ml of water, 1.0 g of sodium iodide, 46.5 ml of aniline and 0.75 g of sodium hydroxide (supporting electrolyte). The cathode (−) compartment was charged with 100 ml of water, 30.0 g of sodium iodide and 2 g of p-phenylenediamine. After a magnetic stirring bar and platinum electrodes (10 $cm^2$ surface area) were added to each compartment, the solution was electrolyzed using a constant current D.C. power supply of about 10 volts at currents up to 1.0 ampere (100 $ma/cm^2$) for a total of 3.5 ampere hours at 25°C with stirring.

The solution in the anode compartment was extracted with methylene chloride. A glc analysis of the extract showed 12.42 g of p-iodoaniline and 0.744 g of o-iodoaniline were produced. This is equivalent to a p-iodoaniline current efficiency of 87.0% and a para to ortho ratio of 94.4 to 5.6.

B. In other experiments carried out similarly to A, 5 g of p-phenylenediamine was added to the cathode compartment without detrimental effect but as little as 0.5 g of p-phenylenediamine added to the anode compartment almost completely inhibited the production of iodoaniline.

In experiments where the initial anode compartment charge containing higher concentrations of sodium iodide, the use of sodium hydroxide as a supporting electrolyte can be omitted without affecting cell operation or performance.

EXAMPLE 19

A. A two-compartment glass electrolytic cell similar to that described in Example 18 was assembled with a perfluorosulfonic acid cation-exchange membrane (Du Pont-type 12V41A) to connect the cell compartments.

The anode compartment was charged with 100 ml of water, 14.5 g of ammonium iodide and 93 ml of aniline. The cathode compartment was charged with 200 ml of water and 29 g of ammonium iodide.

Electrolysis at ~10 volts at 1 ampere (100 ma/cm$^2$) for 4 hours and glc analysis under conditions similar to those described in Example 18 showed that 14.8 g of p-iodoaniline and 0.64 g of o-iodoaniline were produced. This is equivalent to a p-iodoaniline current efficiency of 91% and a para to ortho ratio of 95.8 to 4.2.

B. In an experiment similar to A in which electrolysis was carried out at 0.25 ampere (25 ma/cm$^2$) for 4 hours, 3.82 g of p-iodoaniline and 0.12 g of o-iodoaniline were produced. This corresponds to a p-iodoaniline current efficiency of 94% and para to ortho ratio of 96.9 to 3.1.

C. In another experiment, 30 ml of water in the anode compartment was replaced with 30 ml of concentrated ammonia solution, and electrolysis was carried out at 1 ampere (100 ma/cm$^2$) for 4 hours. A total of 8.46 g of p-iodoaniline and 0.40 g of o-iodoaniline were produced, corresponding to a PIA current efficiency of 52% and a para to ortho ratio of 95.4 to 4.6.

EXAMPLE 20

A. The anode compartment of the cell described in Example 19 was charged with 150 ml of water, 22.5 g of sodium iodide and 139.5 ml of aniline. The cathode compartment was charged with 300 ml of water and 45 g of sodium iodide. The cell was operated at 0.25 ampere (25 ma/cm$^2$) at 25°C for 4 hours, and the anode solution was extracted with methylene chloride and analyzed by glc. A total of 3.30 g of p-iodoaniline and 0.14 g of o-iodoaniline were produced. This corresponds to a p-iodoaniline current efficiency of 81% and a para to ortho ratio of 95.9 to 4.1.

B. When the electrolysis was carried out at 5°C, 1.42 g of p-iodoaniline and 0.044 g of o-iodoaniline were produced. This corresponds to a p-iodoaniline current efficiency of 34.8% and a para to ortho ratio of 97.3 to 2.7.

C. When the electrolysis was carried out at 50°C, 3.65 g of p-iodoaniline and 0.19 g of o-iodoaniline were found corresponding to p-iodoaniline current efficiency of 90% and a para to ortho ratio of 95.1 to 4.9.

EXAMPLE 21

A. A 400-ml beaker was charged with 14.5 g of ammonium iodide, 93 ml of aniline and 100 ml of water. After two platinum electrodes (10 cm$^2$ surface area) were inserted, the solution was electrolyzed at 1.0 ampere (100 ma/cm$^2$) at 25°C with stirring for 1.33 hours using a constant current D.C. power supply.

The solution was extracted with methylene chloride and analyzed by glc. A total of 4.41 g of p-iodoaniline and 0.18 g of o-iodoaniline were formed, equivalent to a p-iodoaniline current efficiency of 81% and a para to ortho ratio of 96.1 to 3.9.

B. In an experiment similar to A in which the electrolysis was carried out at 0.25 ampere (25 ma/cm$^2$) for 4 hours, 3.37 g of p-iodoaniline and 0.10 g of o-iodoaniline were produced equivalent to a p-iodoaniline current efficiency of 83% and a para to ortho ratio of 97.3 to 2.7.

EXAMPLE 22

Solution was pumped from a 600-ml beaker charged with 200 ml of water, 29 g of ammonium iodide and 186 ml of aniline through a flow cell 1 inch in diameter and 6 inches long containing platinum screen electrodes separated by Tyvek spunbonded olefin porous separator, and back to the beaker at a rate of 500 ml/minute (corresponding to a linear velocity of 1.67 cm/sec.).

Electrolysis of the solution was carried out in the cell by passing a current of 0.25 ampere across the electrodes for 4 hours using a constant current D.C. power supply.

After extraction of the solution with methylene chloride, glc analysis showed 2.68 g of p-iodoaniline with 0.07 g of o-iodoaniline were formed. This corresponds to a p-iodoaniline current efficiency of 65% and a para to ortho ratio of 97.5 to 2.5.

EXAMPLE 23

ATTEMPTED ELECTROLYTIC PREPARATION OF p-BROMOANILINE

The anode compartment of the cell described in Example 18 was charged with 150 ml of water, 2 g of sodium bromide, 139.5 ml of aniline and 0.75 g of sodium hydroxide. The cathode compartment was charged with 300 ml of water and 60 g of sodium bromide. The solution was electrolyzed for 6.0 hours at currents between 0.10 and 0.25 ampere (10–25 ma/cm$^2$) for a total of 1.25 ampere hours. The solution in the anode compartment was extracted with methylene chloride, and the brown methylene chloride solution analyzed by glc and mass spectrometry. Aniline and azobenzene were identified as products. On standing, 2.4 g of a bronze-colored solid precipitated from solution. After recrystallization from hot toluene, the solid melted at 241°–243°C but contained no bromine. Anal. Found: C, 81.9; H, 5.6; N, 12.9; mol. wt. in tetrahydrofuran 529, toluene 542 and mass spec. m/e = 529.

Thus, replacement of sodium iodide with sodium bromide in the electrolysis does not give the corresponding bromoaniline.

EXAMPLE 24

1:1 COMPLEX OF CuI AND p-PHENYLENEDIAMINE

Under nitrogen, 3 g of p-phenylenediamine was added to 30 ml of a 4M aqueous ammonium iodide solution saturated with 2.6 g of copper(I) iodide. The resulting suspension was stirred for 15 minutes and the precipitate, the white copper(I) iodide p-phenylenediamine 1:1 complex, collected on a filter (The known copper(I) bromide p-phenylenediamine 2:1 complex is black:Prasad and Trivedi, J. Ind. Chem. Soc. 43, 623–626 (1966)). Analysis of the filtrate showed that 86.2 ppm copper remained in solution; this corresponds to 99.7% removal of the copper(I) iodide as the complex. This experiment demonstrates the successful separation of copper(I) iodide for recycle to the amination reaction.

EXAMPLE 25

SEPARATION OF p-PHENYLENEDIAMINE AND IODIDE p-Phenylenediamine (17 g, 0.16 mole), sodium iodide (24 g., 0.16 mole) and water (58 g) were heated to 80°C until a homogeneous solution was obtained. The solution was cooled slowly to 37°C and p-phenylenediamine was crystallized. The product was separated by filtration at 30°C, washed with water and dried.

Anal. Found: I, 0.4%.

Thus, preliminary purification of p-phenylenediamine to remove the major portion of iodide may be achieved by crystallization from water.

The embodiments of the invention in which an exclusive property or privelege is claimed are defined as follows:

1. A cyclic process of producing p-phenylenediamine from ammonia and aniline which comprises:
   a. electrolyzing aniline with aqueous sodium iodide in an electrolytic cell having a cationic membrane to form an anolyte containing iodoaniline;
   b. reacting the organic portion of the anolyte with ammonia at a molar ratio of ammonia to iodoaniline of at least 1:1 in the presence of a Cu(I) salt catalyst to form a liquid containing phenylenediamine, ammonium iodide and the 1:1 copper(I) iodide-p-phenylenediamine complex;
   c. reacting the liquid from step (b) with sodium hydroxide;
   d. recovering ammonia and p-phenylenediamine from the product of step (c); and
   e. returning sodium iodide recovered after step (c) to step (a).

2. The process of claim 1 in which the product of step (c) is extracted with aqueous sodium hydroxide to recover sodium iodide.

3. The process of claim 1 in which step (b) is carried out in the presence of hydrazine.

4. The process of claim 1 in which the 1:1 copper(I) iodide.p-phenylenediamine complex is recovered from step (b) and recycled thereto.

5. The process of claim 1 wherein phenylenediamine is extracted by means of aniline.

6. A process of producing a phenylenediamine which comprises reacting the corresponding iodoaniline with ammonia carried out in solution containing up to about 5% by weight of water, the molar ratio of ammonia to iodoaniline being at least 1:1,
   in the presence of a catalytic amount of copper or a copper(I) salt, and
   at a temperature in the range of about 0°–160°C.

7. The process of claim 6 wherein the ammonia solution is anhydrous ammonia.

8. The process of claim 6 carried out in nonaqueous solvent.

9. The process of claim 8 wherein the non-aqueous solvent is aniline.

10. The process of claim 9 wherein the solution contains a copper(I) salt and, in addition, 0.1–1.0 mole of hydrazine per mole of copper(I).

11. The process of claim 6 wherein the catalyst is a cuprous halide.

12. The process of claim 11 wherein the catalyst is cuprous iodide.

13. The process of claim 11 wherein the catalyst is the 1:1 copper(I) iodide.p-phenylenediamine complex.

14. The process of claim 6 wherein the catalyst is generated by in situ reduction of a cupric salt.

15. The process of claim 6 wherein the temperature is in the range of about 40°–140°C. and the molar ratio of ammonia to iodoaniline is within the range of about 6:1 to 40:1.

16. The process of claim 6 wherein the iodoaniline is p-iodoaniline and the product is p-phenylenediamine.

17. The process which comprises electrolyzing aqueous ammonium iodide or aqueous alkali metal iodide with aniline at a temperature in the range of about 0°–80°C. and thereby producing p-iodoaniline.

18. The process of claim 17 including the additional step of aminating the p-iodoaniline with ammonia to form p-phenylenediamine and ammonium iodide.

19. The process of claim 18 including the additional steps of recovering iodide ion and electrolyzing the same with aniline.

20. The process of claim 17 wherein the temperature is in the range of about 20°–50°C.

21. The process of claim 6 wherein:
   a. the temperature is in the range of about 40°–140°C.;
   b. the catalyst is at least one of cuprous iodide and the 1:1 copper(I) iodide, p-phenylenediamine complex,
   c. the reaction is carried out in aniline as solvent, and
   d. the ratio of ammonia to iodoaniline is within the range of about 6:1 to 40:1.

* * * * *